UNITED STATES PATENT OFFICE.

WILLIAM C. LAWRENCE, OF INDIANAPOLIS, INDIANA.

POLISHING COMPOSITION.

1,267,236.  Specification of Letters Patent.  Patented May 21, 1918.

No Drawing.  Application filed July 13, 1917. Serial No. 180,470.

*To all whom it may concern:*

Be it known that I, WILLIAM C. LAWRENCE, a citizen of the United States, residing at Indianapolis, in the county of Marion and State of Indiana, have invented new and useful Improvements in Polishing Compositions, of which the following is a specification.

This invention is a composition of matter of a kind and type that may be effectually employed as a polish for varnished and enameled surfaces such as may be found upon vehicles or articles of furniture, and especially for use either in the home, office or garage.

One object is to provide a polish that may be readily compounded at a small cost, reliable and efficient in removing water spots, grease spots and dust spots resulting therefrom without leaving a film to oxidize and gum up the surfaces treated; one that may easily be used with a minimum expenditure of labor and one that will polish varnished and enameled surfaces and tend to revive and renew such surfaces.

The composition may be formed by mixing paraffin oil, raw linseed oil, and oil of lemon.

During the mixing of the several ingredients they should be well shaken so as to thoroughly mix or incorporate them in a mechanical manner to more or less emulsify or form an emulsion. The several ingredients are preferably mixed in the following proportions to obtain the best results:

Paraffin oil _____ ½ gallon.
Raw linseed oil _____ ¼ gallon.
Lemon oil _____ ¼ gallon.

This composition has been found particularly useful upon automobiles that have highly enameled and varnished surfaces, the acidity of the lemon oil serving to cut the grease and dirt, while the linseed oil acts to restore the flexibility of the surface and the paraffin oil further tends to polish and fill up the minute pores of the finished surfaces to prevent the entrance of dust particles. The lemon oil also serves to impart an aromatic odor and also tends to prevent oxidization of the composition on exposure to the air.

To clean the surface of the article, a clean piece of material or rag is saturated with the polish and the surfaces are carefully gone over. It should be well rubbed in a thorough manner. A clean dry piece of material or rag is then used to wipe off the surplus by frictional engagement with the surfaces so treated. The rubbing should be thorough and well done, as the restoration and reviving depend largely upon the rubbing or frictioning of the surfaces gone over.

What I claim is:

1. A composition of matter for polishing varnished and enameled surfaces comprising paraffin oil, raw linseed oil and lemon oil in about the proportions set forth.

2. A composition of matter for polishing varnished and enameled surfaces comprising paraffin oil, 1 part, raw linseed oil, ½ part, and lemon oil ½ part.

In testimony whereof I affix my signature.

WILLIAM C. LAWRENCE.